US012611962B2

(12) United States Patent
Haskara et al.

(10) Patent No.: US 12,611,962 B2
(45) Date of Patent: Apr. 28, 2026

(54) DYNAMIC CONTROL OF BATTERY CHARGING

(71) Applicant: GM GLOBAL TECHNOLOGY OPERATIONS LLC, Detroit, MI (US)

(72) Inventors: Ibrahim Haskara, Macomb, MI (US); Bharatkumar Hegde, Bloomfield Hills, MI (US); Chen-fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 673 days.

(21) Appl. No.: 18/181,092

(22) Filed: Mar. 9, 2023

(65) Prior Publication Data

US 2024/0300377 A1     Sep. 12, 2024

(51) Int. Cl.
*B60L 58/12*          (2019.01)
*H01M 10/44*          (2006.01)

(52) U.S. Cl.
CPC ........... *B60L 58/12* (2019.02); *H01M 10/443* (2013.01); *B60L 2240/545* (2013.01); *B60L 2240/547* (2013.01); *B60L 2240/549* (2013.01)

(58) Field of Classification Search
CPC ................................................... H01M 10/443
USPC ......................................................... 320/152
See application file for complete search history.

(56) References Cited

U.S. PATENT DOCUMENTS 12,485,795 B2 * 12/2025 Klein ..................... G06N 20/00
2024/0413654 A1 * 12/2024 Abbott ............... H02J 7/00712

* cited by examiner

*Primary Examiner* — Nathaniel R Pelton
(74) *Attorney, Agent, or Firm* — CANTOR COLBURN LLP

(57)          ABSTRACT

A system for control of a battery system includes a processor connected to the battery system and configured to perform, in real time during a charging process, acquiring a set of charging parameter measurements, estimating a dynamic performance variable related to an electrochemical phenomenon occurring within the battery system during the charging process, and selecting a stored charging profile from a stored relation based on the charging parameter measurements. The processor is further configured to perform applying a charging current to the battery system based on the selected stored charging profile, inputting the charging parameter measurements, the stored charging profile and the stored relation to a learning agent, and evaluating the stored charging profile according to a reward-based learning process, the learning process including estimating a performance value associated with the stored charging profile. The processor is configured to periodically update the stored charging profile based on the learning process.

20 Claims, 7 Drawing Sheets

DYNAMIC CONTROL OF BATTERY CHARGING

INTRODUCTION

The subject disclosure relates to control of battery charging processes, and more specifically, to real time control of charging current and/or other charging parameters based on electrochemical phenomena.

Vehicles, including gasoline and diesel power vehicles, as well as electric and hybrid electric vehicles, feature battery storage for purposes such as powering electric motors, electronics and other vehicle subsystems. Vehicle battery systems may be charged using power sources such as charging stations, other electric vehicle battery systems and/or an electrical grid. Typically, during charging processes, charging currents are limited to protect battery health. As it is desirable to reduce charging times, it is desirable to provide a device or system that can control charging processes to maximize charging current and minimize charging time while protecting battery components and preserving battery life.

SUMMARY

In one exemplary embodiment, a system for control of a battery system includes a processor electrically connected to the battery system, the processor configured to perform, in real time during a charging process, acquiring a set of charging parameter measurements, the charging parameter measurements including a voltage, a current applied to the battery system during the charging process and a temperature of the battery system, estimating a dynamic performance variable, the performance variable related to an electrochemical phenomenon occurring within the battery system during the charging process, and selecting a stored charging profile from a stored relation based on the charging parameter measurements, where the stored charging profile is subject to a charging limit including a performance parameter limit. The processor is further configured to perform applying a charging current to the battery system based on the selected stored charging profile, inputting the charging parameter measurements, the stored charging profile and the stored relation to a learning agent, and evaluating the stored charging profile by the learning agent according to a reward-based learning process, the learning process including estimating a performance value associated with the stored charging profile. The processor is also configured to periodically update the stored charging profile based on the learning process.

In addition to one or more of the features described herein, the learning process is a model-free iterative learning process.

In addition to one or more of the features described herein, an iteration of the learning process is performed in real time for each time step of the charging process based on the stored charging profile and charging parameter measurements acquired at each time step.

In addition to one or more of the features described herein, periodically updating is performed in response to at least one of completion of the iteration, completion of a selected number of iterations, completion of a charging process and completion of a selected number of charging processes.

In addition to one or more of the features described herein, the learning process includes, for each iteration, estimating the performance value based on a reward feedback that is a function of at least the performance parameter.

In addition to one or more of the features described herein, the reward feedback includes a first reward value associated with charge time, a second reward value associated with battery health, and a third reward value associated with battery aging.

In addition to one or more of the features described herein, the processor is configured to perform, during a design phase, acquiring a set of initial battery conditions associated with the battery system, generating an initial calibrated charging profile by the learning agent using the learning process, the learning process including iteratively evaluating a set of charging parameters, where the evaluating is performed experimentally on a physical battery or performed on a simulation of the battery system, and storing the initial calibrating charging profile as the stored charging profile.

In addition to one or more of the features described herein, the dynamic performance variable is selected from at least one of an electrolyte ion concentration at an anode side of a battery cell, an anode potential, a decay rate of electrolyte anode concentration, and a capacity loss.

In addition to one or more of the features described herein, the charging limit includes a performance variable limit being at least one of: a capacity loss limit, an anode potential limit, a lithium plating limit, and a limit to the electrolyte ion concentration at the anode side of the battery cell.

In addition to one or more of the features described herein, the processor includes a local processing device disposed in a vehicle, the vehicle is configured to wirelessly communication with a remote processing device.

In addition to one or more of the features described herein, selecting the stored charging profile is performed by the local processing device, evaluating the stored charging profile is performed by the remote processing device, and periodically updating the stored charging profile includes transmitting an updated charging profile from the remote processing device to the local processing device.

In another exemplary embodiment, a method of controlling a battery system includes acquiring, by a processor electrically connected to the battery system in real time during a charging process, a set of charging parameter measurements, the charging parameter measurements including a voltage, a current applied to the battery system during the charging process and a temperature of the battery system, estimating a dynamic performance variable, the performance variable related to an electrochemical phenomenon occurring within the battery system during the charging process, and selecting a stored charging profile from a stored relation based on the charging parameter measurements, where the stored charging profile is subject to a charging limit including a performance variable limit. The method also includes applying a charging current to the battery system based on the selected stored charging profile, inputting the charging parameter measurements, the stored charging profile and the stored relation to a learning agent, evaluating the stored charging profile by the learning agent according to a reward-based learning process, the learning process including estimating a performance value associated with the stored charging profile, and periodically updating the stored charging profile based on the learning process.

In addition to one or more of the features described herein, the learning process is a model-free iterative learning process, and an iteration of the learning process is performed in real time for each time step of the charging process based on the stored charging profile and charging parameter measurements acquired at each time step.

In addition to one or more of the features described herein, the learning process includes, for each iteration, estimating the performance value based on a reward feedback that is a function of at least the dynamic performance variable.

In addition to one or more of the features described herein, the performance variable is estimated based on the charging parameter measurements and a mathematical model configured to simulate electrochemical processes in the battery system.

In addition to one or more of the features described herein, the processor includes a local processing device disposed in a vehicle, the vehicle configured to wirelessly communication with a remote processing device, and wherein selecting the stored charging profile is performed by the local processing device, evaluating the stored charging profile is performed by the remote processing device, and periodically updating the stored charging profile includes transmitting an updated charging profile from the remote processing device to the local processing device.

In yet another exemplary embodiment, a vehicle system includes a memory having computer readable instructions, and a processing device for executing the computer readable instructions, the computer readable instructions controlling the processing device to perform a method. The method includes acquiring, by a processor electrically connected to a battery system in real time during a charging process, a set of charging parameter measurements, the charging parameter measurements including a voltage, a current applied to the battery system during the charging process and a temperature of the battery system, estimating a dynamic performance variable, the performance variable related to an electrochemical phenomenon occurring within the battery system during the charging process, and selecting a stored charging profile from a stored relation based on the charging parameter measurements, where the stored charging profile is subject to a charging limit including a performance variable limit. The method also includes applying a charging current to the battery system based on the selected stored charging profile, inputting the charging parameter measurements, the stored charging profile and the stored relation to a learning agent, evaluating the stored charging profile by the learning agent according to a reward-based learning process, the learning process including estimating a performance value associated with the stored charging profile, and periodically updating the stored charging profile based on the learning process.

In addition to one or more of the features described herein, the learning process is a model-free iterative learning process, and an iteration of the learning process is performed in real time for each time step of the charging process based on the stored charging profile and charging parameter measurements acquired at each time step.

In addition to one or more of the features described herein, periodically updating is performed in response to at least one of completion of the iteration, completion of a selected number of iterations, completion of a charging process and completion of a selected number of charging processes.

In addition to one or more of the features described herein, the performance variable is estimated based on the charging parameter measurements and a mathematical model configured to simulate electrochemical processes in the battery system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
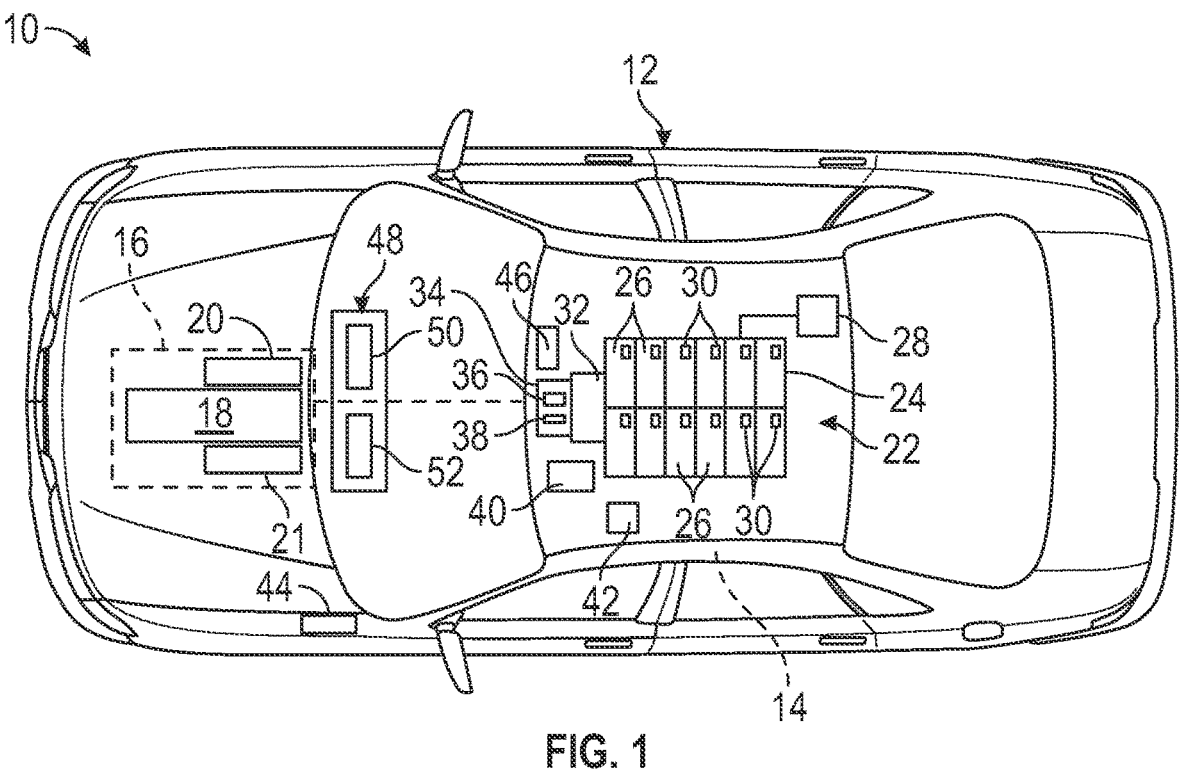
FIG. 1 is a top view of a motor vehicle including a battery assembly or system and a battery charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for controlling charging of a battery system, such as an electric vehicle or hybrid vehicle battery system. The embodiments may be applicable to various charging processes, such as conventional charging and direct current (DC) fast charging (DCFC). For example, the embodiments can be employed in DCFC processes to prevent degradation of battery health due to high currents and factors such as lithium plating.

An embodiment of a method includes receiving measurements of charging parameters during a vehicle battery charging process, and calculating one or more dynamic variables that are based on electrochemical phenomena that occur during the charging process. Examples of dynamic variables include liquid phase lithium ion concentration of electrolyte around an anode current collector, anode potential, lithium plating or related variables (e.g., anode potential drop) and others. The dynamic variables are estimated based on the charging parameter measurements and electrochemical properties of the battery system. At least one dynamic variable may be estimated using a mathematical model of the battery system ("battery model"), such as a pseudo-two dimensional model or other physics-based model. It is noted that embodiments are not limited to the specific models described herein, as any suitable models or simulations that capture electrochemical phenomena may be used.

Real time charging parameter measurements and dynamic variables are used to control a charging current applied to a battery system. In an embodiment, current is controlled according to one or more stored charging profiles that prescribe levels of current to be applied. A charging profile (also referred to as a "current profile") may include a single current level or multiple current levels as a function of time or state of charge (SOC). The method includes receiving charging parameter measurements (a measured state or present state of a battery system) at a given time step, and consulting a lookup table (LUT) or other data structure (e.g., neural network) to select a charging current that is related to the measured state. The selected charging profile (also referred to as a "calibrated charging profile") is used to control the charging current at the present time step.

In an embodiment, the method includes performing a learning process to evaluate the calibrated charging profile at each time step of the charging process. For example, a Q-learning process or other data-driven learning process is used to evaluate the performance of the calibrated charging profile, and derive an optimal charging profile at each time step. A charging profile may be updated periodically by updating the LUT according to the optimal charging profile and associated optimal Q-value. Such updates may be based on cumulative evaluation data and/or historical data, so that updates can be applied in response to long term changes in battery conditions (e.g., aging and degradation).

In an embodiment, the learning process is a reinforcement learning process, such as a model-free Q-learning process. However, embodiments are not so limited and can utilize any suitable learning process.

Embodiments described herein present numerous advantages and technical effects. The embodiments provide for effective control of battery charging parameters, so that charging time can be reduced or minimized while simultaneously maintaining charging current within prescribed limits. Current practices typically calculate current limits considering various battery health factors; however, such practices can be overly conservative, resulting in sub-optimal charging times. The embodiments described herein are able to relax current limits based on predictions, so that charging times can be improved without negative effects.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine assembly 18 and at least one electric motor assembly. For example, the propulsion system 16 includes a first electric motor 20 and a second electric motor 21. The motors 20 and 21 may be configured to drive wheels on opposing sides of the vehicle 10. Any number of motors positioned at various locations may be used.

The vehicle 10 includes a battery system 22, which may be electrically connected to the motors 20 and 21 and/or other components, such as vehicle electronics. The battery system 22 may be configured as a rechargeable energy storage system (RESS).

In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 (e.g., RESS controller) configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 is electrically connected to a DC-DC converter module 32 and an inverter module 34. The inverter module 34 (e.g., a traction power inversion unit or TPIM) converts direct current (DC) power from the battery assembly to three-phase alternating current (AC) power to drive the motors. In an embodiment, the inverter module 34 includes a first inverter 36 connected to the motor 20, and a second inverter 38 connected to the motor 21.

The battery system 22 may also be connected to other vehicle components or systems. For example, the battery system 22 is connected to an auxiliary power module (APM) 40, which controls power output to components such as a heating system. The APM 40 can be used to supply power from the battery system 22 for heating the occupant compartment 14.

The vehicle 10 may include a charging system that can be used to charge the battery pack 24 and/or used for supplying power from the battery pack 24 to charge another energy storage system (e.g., vehicle-to-vehicle charging). The charging system includes an onboard charging module (OBCM) 42 that is electrically connected to a charge port 44.

In an embodiment, the vehicle 10 includes a charging control system configured to control charging parameters based on electrochemical phenomena. As discussed further herein, the charging control system calculates values of one or more dynamic variables corresponding to such phenomena, and controls charging current or applied current based on limits calculated using the dynamic variables and a battery model. In addition, the charging control system utilizes learning techniques to evaluate the performance of charging profiles, and periodically update charging profiles based on changes in battery conditions during charging, and/or long term changes (e.g., changes over multiple charging processes). The charging control system includes a processing device or processor, which may be any suitable processor, such as the RESS controller or monitoring unit 28, the OBCM 42 or a dedicated controller 46.

The vehicle 10 also includes a computer system 48 that includes one or more processing devices 50 and a user interface 52. The various processing devices and units may communicate with one another via a communication device or system, such as a controller area network (CAN) or transmission control protocol (TCP) bus.

The charging control system utilizes a set (i.e., one or more) of defined performance variables that are estimated in real time and used in real time to adapt current requests to maintain applied current within one or more limits, to improve or maximize charging time while avoiding negative effects (e.g., lithium plating). In an embodiment, the set of performance variables, in combination with measured charging parameters, are used to select a charging profile stored locally or remotely. The charging profile may be selected from a data structure that relates each stored charging profile to a set of parameter values. A relation between a stored charging profile and a set of parameter values is referred to herein as a "charging profile mapping" or "limit map".

Values of the one or more performance variables may be estimated using a battery model that simulates various electrochemical processes or phenomena that occur during a charging process.

Examples of performance variables include dynamics related to electrolyte liquid-phase lithium concentration ($c_e$) at an anode current collector (e.g., rate of decay of $c_e$ at an anode), anode and cathode solid-phase lithium concentrations, anode potential ($V_n$), cathode potential and/or aging related effects (e.g., capacity loss, a lithium plating boundary). The liquid phase lithium concentration at the anode is referred to herein an "anode electrolyte concentration" or $c_{e,n}$.

The performance variables may also include dynamics related to battery aging (e.g., capacity loss) and dynamics related to battery health. Parameters related to battery health include, for example, the anode electrolyte concentration $c_{e,n}$, the anode potential ($V_n$), capacity loss ($g_{loss}$) and a lithium plating boundary ($y_{LiP}$).

In an embodiment, the performance variables are generated for lithium-ion battery cells, but are not so limited. For example, the model and performance variables can be adapted for various other types of battery chemistries.

Aspects of the methods described herein can be performed using a local controller in a vehicle (e.g., the monitoring unit or RESS controller 28, or other processor of the vehicle's battery management system (BMS)), a remote processing device, or a combination thereof. For example, some functions may be performed by a vehicle processor, and other functions may be performed in a cloud computing system or other network (e.g., via vehicle-to-cloud communication).

The charging control system is configured to control current during charging by limiting the current (or C-rate) based on the one or more dynamic variables. Values of one or more dynamic variables may be estimated using a mathematical model of a battery cell. The mathematical model simulates electrochemical and physical processes that occur when a battery cell is being charged and/or discharged. In an embodiment, the model is a physics-based model of a lithium-ion battery cell (or other chemistry). Examples of such models include microscale models, pseudo three-dimensional models (P3Ds), pseudo two-dimensional models (P2D), single particle models (SPMIs) and SPMe (SPM with electrolyte).

In an embodiment, the model is a P2D model, which is also referred to as a Doyle-Fuller-Newman (DFN) model or Newman model. The P2D model describes transport of lithium ions, cell thermodynamics and kinetics within a lithium ion battery cell.

The P2D model simulates electrochemical processes based on a simulation of a lithium-ion cell. The cell includes a porous anode and cathode, which are made from solid active materials that can store lithium intercalated in the solid material. The anode is connected to an anode current collector and the cathode is connected to a cathode current collector. A separator is disposed between the anode and the cathode, and allows the passage of ions but not electrons. The porous electrodes and the separator are soaked in an electrolyte, which allows the transport of ions. During discharge, lithium stored in the anode is released as ions in the electrolyte. Driven by diffusion (concentration gradient)

and migration (electric potential gradient), lithium ions travel through the separator to the cathode where they are inserted in the lattice of the cathode active material.

Simultaneously, electrons travel from the anode to the cathode through an external circuit. This process is reversed during battery charging.

The P2D model simulates a battery cell, and accounts for a number of variables. The variables are related to lithium ion concentration and transport, temperature, electrical potential and other phenomena. The variables also include one or more selected performance variables.

The following equations represent an example of a model that can be used for estimation of dynamic variables. In this example, the model is a simplified version of a full-order P2D model. Dependent variables in the model include lithium ion concentration in the electrolyte (i.e., electrolyte concentration $c_e$), average lithium ion concentration in the solid phase in the electrodes (i.e., average concentration $c_a$), and surface lithium ion concentration of the solid phase in the electrodes (i.e., surface concentration $c_s$). The concentrations are represented using the subscript i to indicate the positive side of the battery (i=p) and the negative side (i=n). For example, $c_e$ at the positive side is denoted $c_{e,p}$, and $c_e$ at the negative side is denoted $c_{e,n}$.

Charge dynamics in the cell can be described using sets of ordinary differential equations (ODEs). For example, the time derivatives of $c_{a,i}$ and $c_{s,i}$ and $c_{e,i}$ can be calculated using a set of ODEs as follows:

$$[\dot{c}_{a,i}\dot{c}_{s,i}] = ODE(c_{a,i}, c_{s,i}, T, I, p)$$

$$[\dot{c}_{e,i}] = ODE(c_{e,i}, I, p)$$

where T is temperature of the cell, I is current and p is a static parameter (or set of static parameters). The time derivative of T is a function of T, I and p.

In addition, model parameters can be adjusted or configured to reflect effects of aging during long-term use of a battery system. For example, an aging parameter such as capacity loss ($q_{loss}$) is incorporated into the model so that battery behavior over a life cycle of a battery system is accounted for. Aging parameters can be updated locally within a vehicle or remotely (e.g., transmitting charging parameter measurements and charg control information to a cloud network, and receiving over the air updates). For example, the model can be periodically updated (e.g., after each completed charging process or after a selected number of completed charging processes), either locally or over the cloud.

Using the model, various parameters can be calculated and/or predicted. The following equations represent examples of calculations of state of charge (SOC), capacity loss ($q_{loss}$), difference in electrochemical potential between the anode and the cathode over the electrolyte ($\Delta\Phi$), and overpotential ($\eta_i$):

$$SoC = \left(\left(\frac{c_{a,n}}{c_{a,n}^{max}}\right) - \theta_n^{min}\right)/(\theta_n^{max} - \theta_n^{min})$$

$$q_{loss}(\%) = a_c(.)\exp(-E_{ac}/RT) \cdot Ah^n \quad p = p(q_{loss}, .)$$

$$\Delta\Phi = K_{eff}(p) \cdot C_{rate} + K_e T\left[ln\left(\frac{c_{e,p}}{c_{e,n}}\right)\right]$$

$$\eta_i = \frac{2TR}{F} \cdot asinh(f(I, c_{e,i}, c_{s,i}, p))$$

In the above equations, $c_{a,n}$ is solid phase concentration at the anode, $c_{a,n}^{max}$ is a maximum solid phase concentration at the anode, $\theta_n^{min}$ is a minimum state of charge at the anode, and $\theta_n^{max}$ is a maximum state of charge at the anode. $a_c$ is a fitting factor, $E_{ac}$ is activation energy, R is a constant, and $Ah''$ is total capacity. $K_{eff}$ is effective electrolyte conductivity, and $C_{rate}$ is the C-rate.

The open circuit voltage ($V_{oc}$) of the cell, and the cell voltage ($V_{cell}$), can be calculated as follows:

$$V_{OC} = OCP_p(c_{a,p}, T) - OCP_n(c_{a,n}, T)$$

$$V_{cell} = V_{OC} + \Delta\Phi - \eta_p - \eta_n$$

where $OCP_p$ is the open circuit potential at the cathode, $OCP_n$ is the open circuit potential at the anode, overpotential $\eta_p$ is the overpotential at the cathode, and $\eta_n$ is the overpotential at the anode.

As noted above, the charging control system calculates one or more performance variables based on measurements of charging parameters during a charging process.

In an embodiment, the performance variables include electrolyte concentration at an anode current collector ($c_e$). During charging, the $c_e$ at the anode decays from an initial value to a value that decreases within increased C-rate. "C rate" is defined as a rate at which a battery is discharged relative to a maximum capacity of the battery, and may be a measure of charging current normalized by capacity. A limiting factor of the C-rate is lithium depletion (or electrolyte depletion), which occurs when the concentration $c_e$ at the anode is close to zero.

For example, a performance variable is a decay rate of the anode electrolyte concentration (i.e., concentration of lithium ions in the separator anode-side). The decay rate is a rate at which the concentration decreases over time, denoted as $dc_e/dt$. The decay rate can be calculated according to a rate at which the concentration converts to steady state, based on the following equation:

$$\tau \frac{dc_e}{dt} = c_e - c_{e,ss}$$

where $c_e$ is electrolyte concentration at the anode, and $c_{e,ss}$ is the steady state concentration. $c_{e,ss}$ is a function of C-rate. $\tau$ is a time constant that describes the rate of drop in concentration, which can be a function of C-rate and temperature T.

Anode potential $V_n$ (and/or parameters related to anode potential) is another performance variable that can be used for control of charging. The anode potential $V_n$ depends on open circuit potential at the anode and overpotential as follows:

$$V_n = OCP_n(c_{a,n}, T) + \eta_i$$

At high C-rates, the anode potential $V_n$ decreases as SOC increases, and the rate at which the anode potential decreases is more pronounced at low temperatures. If the anode potential drops to zero or negative, lithium plating can occur. Lithium plating is detrimental, as this phenomenon can result in rapid capacity loss and short circuits. Accordingly, by monitoring anode potential dynamics and applying appropriate limits to the charging rate, lithium plating can be avoided while minimizing charge time.

In an embodiment, the performance variables include a variable related to internal processes that can result in lithium plating. An example is referred to as a lithium plating boundary ($y_{LiP}$), which is a function of SOC (or voltage), temperature and C-rate:

$$y_{LiP} = f(SOC, C_{rate}, T \ldots).$$

For a given temperature T, the C-rate has an inverse linear relationship to SOC or voltage (i.e., C-rate decreases linearly as voltage or SOC increases). For example, $y_{LiP}$ can be expressed as:

$$y_{LiP} = a(SOC) + b(C_{rate}),$$

where a is the slope and b is the y-intercept (for a graph having an x-axis representing C-rate and a y-axis representing SOC).

The example of the battery model describes a battery system according to the following equations, where x is a state vector representing a model state (system state). Charging parameter measurements are represented as an output vector y:

$$\dot{x} = F(x, u, p)$$

$$y = G(x, u, p)$$

where u is an input to the model (e.g., current I). F and G are functions of the input (u=I), the state vector x and static variables p.

A system state (e.g., system state at an instant or present time step) is represented by a first set of parameters, and the model output is represented by a second set of parameters, examples of which include:

$$x = [c_{a,n}, c_{a,p}, c_{s,n}, c_{s,p}, c_{e,n}, c_{e,p}, T, q_{loss}]$$

$$y = [V_{cell}, T]$$

A Kalman filter or other suitable algorithm may be used in conjunction with the model to estimate values of performance parameters, such as values of $V_n$. In an embodiment, the algorithm is an extended Kalman filter (EKF). The EKF estimates a state of the battery system at a given time step based on battery charging parameter inputs and measurements. The EKF estimates the continuous-time state of the battery system based on the input, model outputs and initial conditions. The estimated state is represented as a continuous-time state $\hat{x}$ as follows: $\dot{\hat{x}} = F(\hat{x}, u, p) + K \cdot [y - G(\hat{x}, u, p)]$, where K is the Kalman gain. The Kalman gain can be calculated according to the following equations:

$$\dot{\hat{x}} = F(\hat{x}, u, p) + K \cdot [y - G(\hat{x}, u, p)]$$

$$\dot{P} = FP + PF' - KGP + Q$$

$$F = \partial F / \partial x$$

$$G = \partial G / \partial x$$

$$K = PG' R^{-1}$$

where $\hat{x}$ is the estimated state, P is a predicted covariance estimate, F is a transition matrix from the system state, F' is the transposed transition matrix, G is a matrix of measurements, and Q is covariance.

Figure 2:
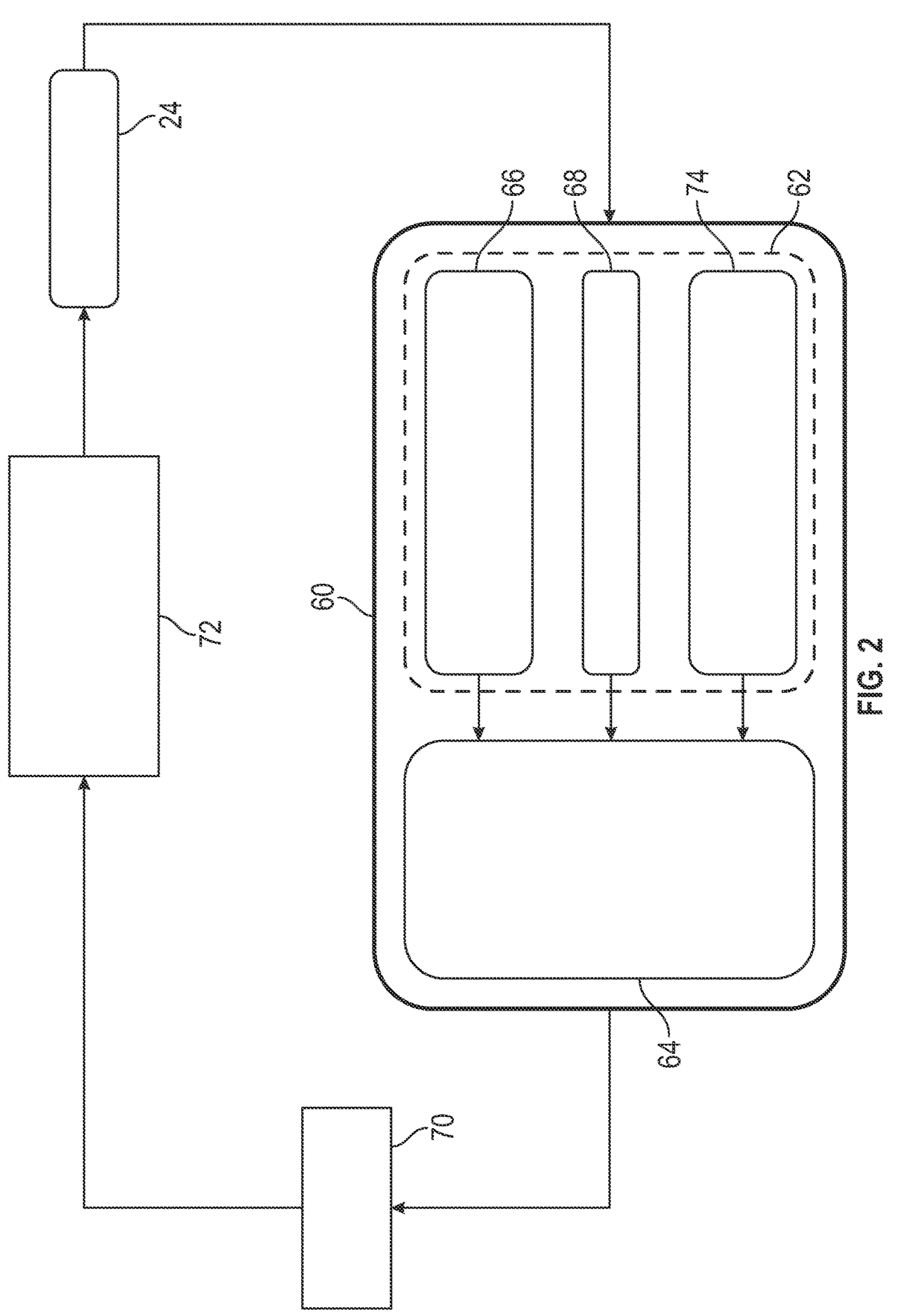
FIG. 2 depicts components of a battery charging control system, in accordance with an exemplary embodiment.

FIG. 2 depicts an embodiment of a charging control system 60. The charging control system 60 includes a first layer 62 and a second layer 64. The layers may be individual processors in coordination or a single processor.

As shown, the charging control system 60 is configured to receive charging parameter measurements of a battery system such as the battery pack 24 (e.g., battery voltage $V_{batt}$, battery current $I_{batt}$ and temperature $T_{batt}$) in real time, and input the charging parameter measurements to the first layer 62. The first layer 62 uses charging parameter measurements to estimate performance variables 66 (and/or other variables related to battery behavior). In addition, the charging control system 60 receives baseline calibration data 68. The performance variables 66 and baseline calibration data 68 are used to estimate or select charging parameters 70 (e.g., SOC, I, T, . . . ), which are in turn used to select or determine a charging profile 72 (target current profile) that is sent to the battery system 22.

The second layer 64 receives the performance variables and baseline calibration data, the charging profile 72 being used at the present or current time step (the "present charging profile"), and other related information, and performs a data-driven learning process to optimize charging parameters. The learning process, in an embodiment, is an iterative reward-based learning process that evaluates the performance of a charging process. Using the learning process, charging profiles can be generated and/or updated in response to changes in battery conditions, to that costs such as charge time and impacts of aging are reduced or minimized while keeping the charging process within selected limits and constraints.

As noted above, the charging control system 60 utilizes stored current profiles. Each stored current profile prescribes current values selected so that a present battery system state stays within desired limits and constraints. The limits and constraints include pre-selected design limits such as maximum cell voltage ($V_{cell,max}$), SOC limits, current limits and temperature limits. The limits and constraints also include limits related to performance variables ("performance variable limits").

Each stored current profile is related in a data structure to a set of charging parameters. For example, a stored charging profile ($I_{DCFC}$) is related via a lookup table (LUT) to a set of charging parameters. A stored charging profile that is related to a set of charging parameters is configured such that, given specific values for each charging parameter in a set, the charging profile prescribes a value or pattern of applied current that maintains conditions of a battery system within one or more limits and constraints. A relation between a stored charging profile and a set of charging parameter values is referred to herein as a "limit map." It is noted that, although embodiments are discussed in conjunction with DCFC charging, the embodiments are applicable to various charging systems and charging schemes.

An example of a limit map is represented by:

$$I_{DCFC} = LUT(V_{cell}, SOC, T, SOH),$$

where $V_{cell}$ is a voltage of a battery system, SOC is state of charge, T is temperature and SOH is state of health of a battery system. The charging profile $I_{DCFC}$ prescribes an amount of current that can be applied while maintaining battery conditions with selected limits and constraints. The limits and constraints may include design limits, as well as performance variable limits.

For example, the above example of a limit map is subject to design limits (e.g., minimum, maximum and/or rate limits) for $V_{cell}$, SOC, T and I, and performance variable limits such as maximum capacity loss ($q_{loss,max}$), a maximum anode electrode concentration ($c_{e,n,limit}$), maximum anode voltage ($V_{n,limit}$) and a maximum boundary plating limit ($y_{LiP,limit}$).

In addition, for optimization functions (i.e., evaluating the performance of charging profiles), various optimization formulations 74 are provided. These formulations provide a framework for a learning process, and include data such as reward feedback functions and format of a value function (e.g., Q-value).

Figure 3:
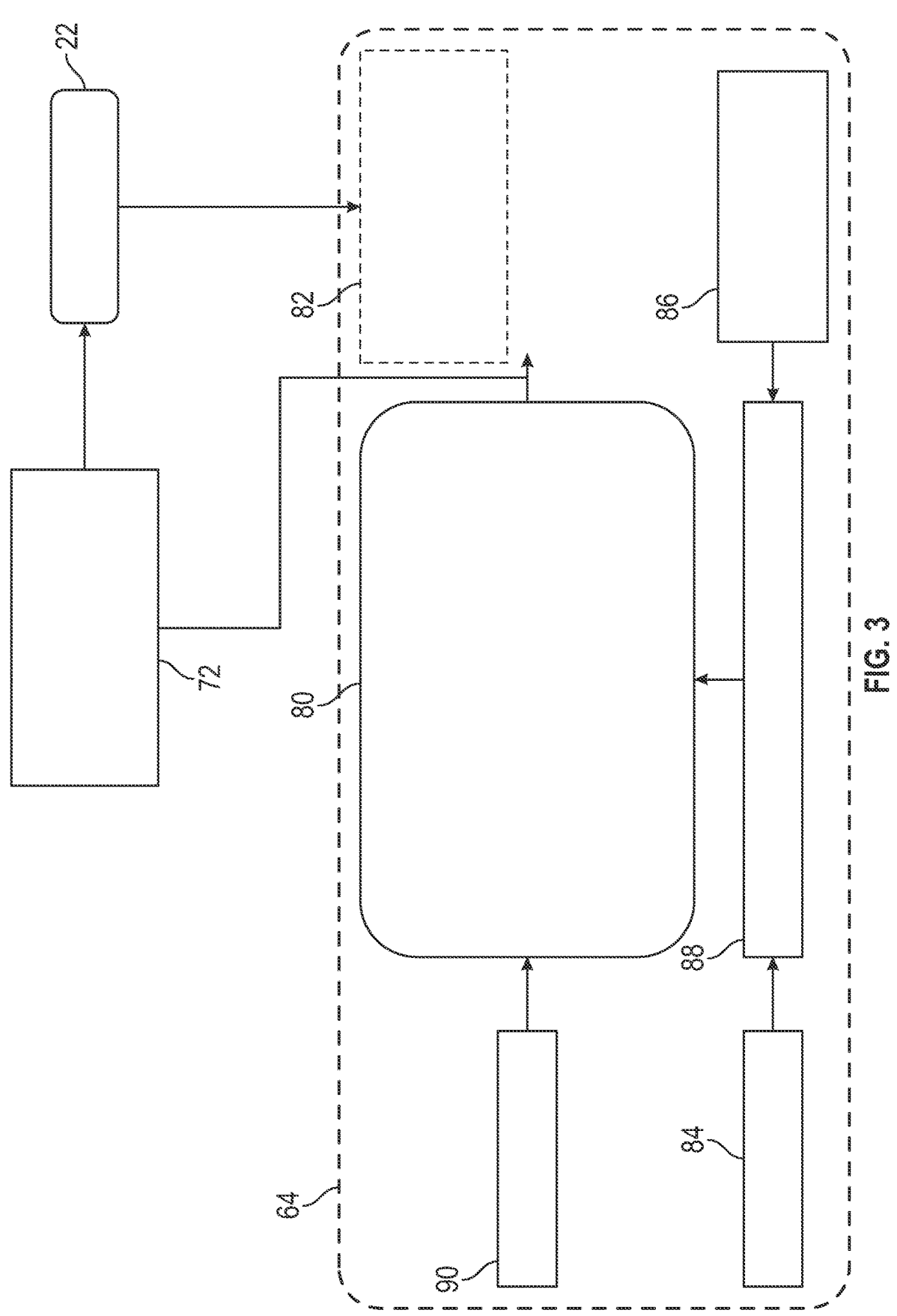
FIG. 3 schematically depicts a learning process for evaluating performance of charging profiles, in accordance with an exemplary embodiment.

FIG. 3 depicts aspects of the charging control system 60 and an embodiment of a learning process. Although embodiments are described in conjunction with a Q-value learning process, the embodiments are not so limited. For example, current profiles and limit maps can be optimized using various learning processes, such as machine learning, Bayesian optimization, active learning (e.g., supervised learning, reinforcement learning, etc.) and others.

The second layer 64 includes a learning agent 80 that performs a model-free optimization method or learning process, which is used to evaluate the performance of a charging process, and iteratively update stored charging profiles using performance feedback and one or more reward functions.

For example, the learning agent 80 is configured to perform a Q-learning process that includes calculating a performance value or quality value (also referred to as a "Q-value"). The optimization method uses data at each time step, along with various optimization or learning formulations 74, to iteratively evaluate the battery system state and a charging profile, and optimize the charging profile using various reward feedback (RF) functions.

The learning agent 80 is used to initially set up or generate a learning formulation, which includes functions for the Q-value and functions for estimating values of the RF functions. In an embodiment, the learning formulation is set up by defining the Q-value as the following internal mapping:

$$Q = Q(s, u)$$

where s is a system state (values of charging parameters and/or performance variables) and u is an action. For example, s includes a set of parameters and u is a charging profile as follows:

$$s = [Vcell, SOC, T, q_{loss} \cdots ]$$

$$u = I_{DCFC}.$$

Generating the Q-value includes defining an initial state s and an initial charging profile, and iterating for multiple changes to the charging profile. In each iteration, the charging profile $I_{DCFC}$ is applied and a system response is recorded, and a Q-value is calculated based on one or more RF functions. Iterations are repeated until the Q-value converges and an optimal charging profile is found. This can be represented as:

$$I_{DCFC} = \pi(S) = \arg\max_u Q(s, u)$$

$$\pi(S) = LUT(V_{cell}, SoC, T, SOH)$$

where $\pi(S)$ is the optimal limit map for a time step after learning. Determination of the optimal limit map may also be based on historical and/or cumulative performance data.

One or more RF functions are used to calculate the performance of a given charging profile by iteratively calculating reward feedback and applying the feedback to produce an optimal charging current. This may be achieved via a Markov decision process (MDP). The optimization is represented by:

$$Q(s, u) \leftarrow [1 - \alpha] \, Q(s, u) + \alpha \left[ RF(s, u) + \gamma \max_{u'} Q(s', u') \right],$$

where Q(s,u) is the Q-value for a present system state and present charging profile, and Q(s',u') is the Q-value for an optimum charging profile and corresponding system state. RF is a reward feedback calculated by applying a charging profile to a present system state. α is a learning rate (between 0 and 1) and γ is a discount factor.

In an embodiment, at a time step of a charging process, a stored current profile is selected to control charging current. The stored current profile may be a calibrated current profile that is associated with a calibrated Q-value. The calibrated Q-value is a most recent Q-value (the Q-value at the immediately preceding time step or the Q-value at an onset of the charging process). For example, at a given time step, the calibrated Q-value is a stored Q-value $Q_{cal}$ that corresponds to the charging profile applied to a battery system at a present time step.

In an embodiment, the reward feedback is calculated based on one or more of the performance variables. The reward feedback may include one or more reward feedback (RF) functions related to performance variables and other parameters. Examples of RF functions include an RF function ($RF_{chargetime}$) that is based on parameters related to charge time (duration of a charging process), an RF function ($RF_{SOH}$) related to battery health, and an RF function ($RF_{aging}$) related to battery aging. An example of the $RF_{aging}$ function is:

$$RF_{aging} = -g * q_{loss},$$

where g is a constant describing rates of change in $q_{loss}$ due to aging, which may be derived from historical data or simulations.

An example of the $RF_{chargetime}$ function includes:

$$RF_{chargetime} = I_{DCFC} - I_{HW,max};$$

$$RF_{chargetime} = SOC - SOC_{ref};$$

ε at each time step, where $I_{HW,max}$ is a maximum current limit, $SOC_{ref}$ is a SOC setpoint (e.g., from initial calibration or set up of the charging process), and ε is a positive constant based on historical data or simulation that increases the RF function value with increasing charge time.

An example of the $RF_{SOH}$ is:

$$RF_{SOH} = W_1(y_{LiP} - y_{LiP,limit}) + W_2(c_{e,n} - c_{e,n,limit}) + W3(V_n - V_{n,limit}) + \ldots,$$

where:

$$W_i(e) = \begin{cases} 0 & \text{for } e < 0 \\ -w & \text{otherwise} \end{cases};$$

or $$W_i = \min(-w.\tanh(g \cdot (e - \varepsilon)), 0).$$

In the above, e represents a difference between a performance variable value and a performance variable limit.

Other parameters or factors related to battery health may be included as one or more additional W functions.

In an embodiment, the RF function is a combined function that incorporates individual RF functions. An example of a combined function is:

$$RF = RF_{chargetime} + RF_{SOH} + RF_{aging}.$$

Referring again to FIG. 3, during a charging process, the learning agent 80 receives charging parameter measurements (e.g., measurements of V, I and T). The charging parameters may optionally be modified during a design phase by inducing variations (e.g., random selected from a distribution) so that a generated charging profile is robust to natural variability (denoted by block 82). Baseline data 84 and a model 86 (e.g., a P2D model or simplified model discussed above), as well as RF functions 88 are provided. One or more system states 90 are also provided to the learning agent 80.

The learning agent 80 and/or other components of the charging control system 60 can be used in both a design phase and used in real time during charging. During the design phase, the learning agent 80 can generate an initial calibrated charging profile via a learning-based calibration strategy that learns the optimal charging profile at a given state of a battery system based on various design specifications. The initial charging profile can be generated by learning the calibration iteratively by experimenting on an actual battery, or using a high-fidelity model. The initial calibrated charging profile can then be stored as an optimal profile given initial battery conditions and charging parameters.

During real-time implementation (i.e., learning and updating charging profiles), the initial calibrated charging profile is evaluated and intermittently updated using a learning strategy as described herein. In this way, the charging profile can be optimized and customized to account for natural variations and changing battery conditions (including changes due to battery aging).

Figure 4:
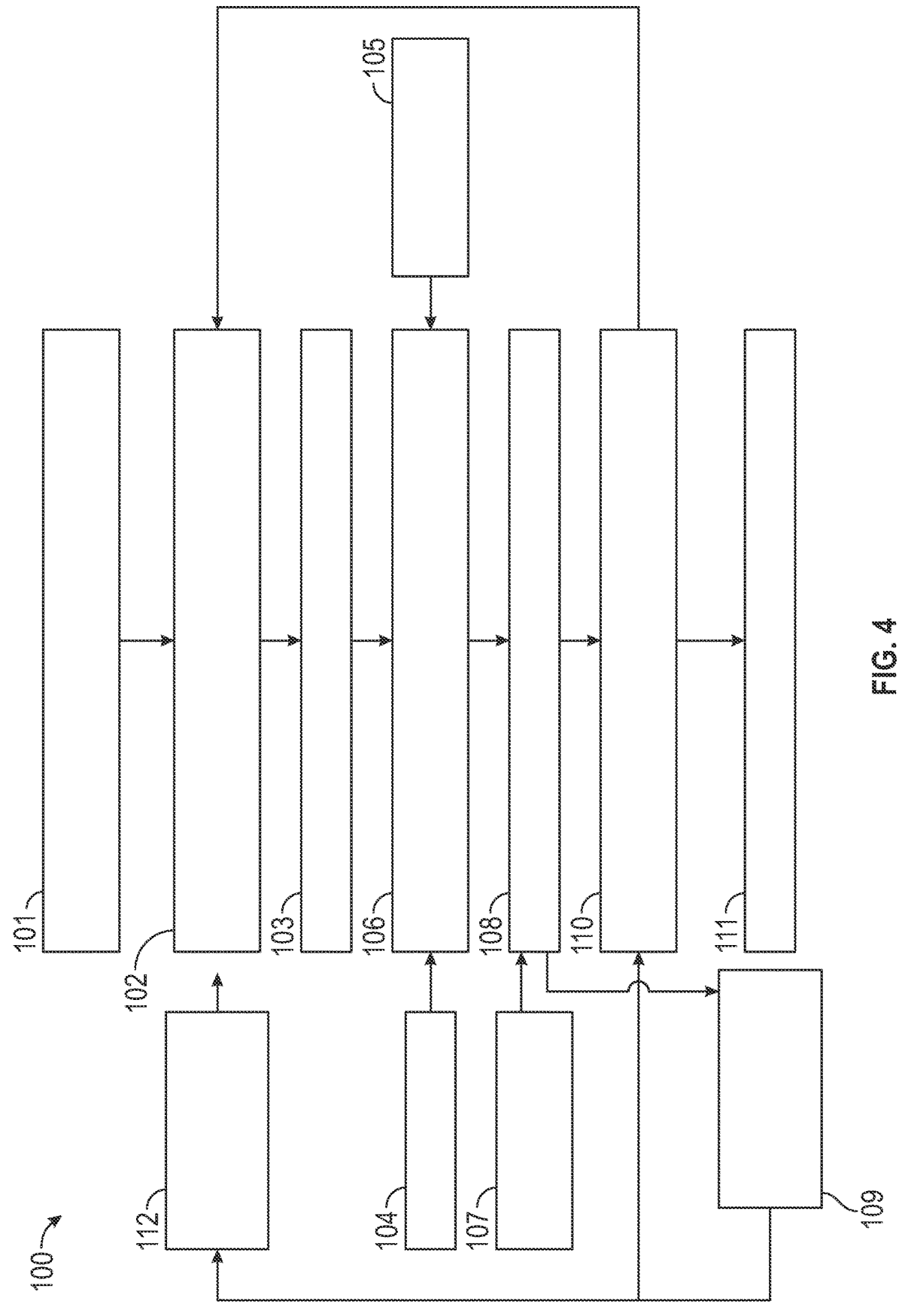
FIG. 4 is a flow diagram depicting a method of controlling a charging process, in accordance with an exemplary embodiment.

FIG. 4 illustrates embodiments of a method 100 of controlling charging of a battery system. The method 100 is performed during a charging operation, and includes analyzing the performance of a charging profile, and periodically providing updates to optimize the charging profile. Aspects of evaluating performance and providing updates may be performed locally, or remotely (e.g., in a cloud network).

The battery system may be part of a vehicle (e.g., as a HV battery pack or packs) or any other suitable battery system. Aspects of the method 100 may be performed by a processing device or system, such as the OBCM 42 and/or the controller 46. The method 100 is described in conjunction with the vehicle 10 and components thereof, but is not so limited, as the method 100 may be performed in conjunction with any suitable vehicle or battery assembly.

The method 100 includes a number of steps or stages represented by blocks 101-111. The method 100 is not limited to the number or order of steps therein, as some steps represented by blocks 101-111 may be performed in a different order than that described below, or fewer than all of the steps may be performed.

At block 101, optimization or learning formulations are set up as discussed herein. For example, an initial value function is calculated or derived from a charging profile that is applied to a battery system at a present time step of a charging process. For example, a Q-value $Q_{cal}$ is calculated by mapping an initial charging profile, or $Q_{cal}$ is the value function associated with a present charging profile ($I_{DCFC,cal}$).

At block 102, a charging process is initiated by connecting the charge port 44 to a power source, such as a DC fast charging (DCFC) charging station. For example, the charge port 44 is connected to a charging station, another vehicle (for vehicle-to-vehicle or V2V charging), a power outlet connected to an electric grid (for vehicle-to-grid charging) or other power source.

The present charging profile $I_{DCFC,cal}$ is acquired, for example, by retrieving a stored charging profile from a LUT. In the LUT, the profile $I_{DCFC,cal}$ is related in a LUT to a set of charging parameter values (e.g., $LUT_{cal}(SOC,V_{cell},T)$). The charging profile $I_{DCFC,cal}$ may be a previous charging profile from the latest calculated Q-value (e.g., Q-value of the latest charging profile from a previous charging process), or a baseline profile determined from a previous calibration.

During the present time step, a charging current is applied to the battery system according to the charging profile $I_{DCFC,cal}$. The charging profile is described as a DCFC profile for discussion purposes, but the method 100 is not so limited.

At block 103, the processing device receives charging parameter measurements. Examples of charging parameter measurements include real time measurements of battery voltage $V_{batt}$, battery current $I_{batt}$ and temperature $T_{batt}$. Measurements of $V_{batt}$ may include a voltage measurement of a single cell or group of cells (e.g., a pair of cells or a module 26). For measurements of multiple cells and/or multiple modules, a voltage value can be derived by combining measurements (e.g., mean cell voltage) or providing a representative measurement (e.g., a cell determined to have the lowest state of health). Alternatively, charging parameter measurements may be determined from a simulation of the battery system.

Baseline calibration data is acquired at block 104, and a battery model is acquired at block 105. The baseline calibration data may include various calibrated limits such as maximum voltage. The battery model may be locally stored (e.g., embedded locally in the charging control system) or acquired from a remote location.

At block 106, one or more performance variables are calculated in real time. In an embodiment, an estimator calculates one or more dynamic variables from a model, such as the exemplary model discussed herein, and the charging parameter measurements. The estimates can be considered "virtual measurements" which are not directly measured, but rather indirectly estimated from the model. For example, a local copy of the model is used to estimate the performance variable, which may be a copy of an embedded model (stored in a vehicle) or a model stored in a cloud network or other remote location.

In an embodiment, a EKF or other estimation algorithm is used to estimate values of the one or more performance variables. For example, the EKF estimation discussed above is performed in conjunction with the exemplary model discussed above.

Examples of performance variables include anode voltage ($V_n$) and lithium plating boundary $y_{LiP}$ estimated using the model. It is noted that other estimation techniques may be used, such as data-driven techniques (e.g., neural network) or techniques that combine data-driven and model based estimations.

At block 107, an optimization formulation is acquired, and input to an optimizer or other processor (e.g., an optimizer of layer 64). The optimization formulation includes, for example, reward feedback functions and dynamic variable limits.

At block 108, the present charging profile $I_{DCFC,cal}$ is evaluated for performance using a learning process as described herein. For example, reward feedback is calculated based on the variables and reward feedback functions, and the learning process is iterated by adjusting the charging profile until an optimal Q-value function ($Q_{opt}$) is determined.

At block 109, RF functions and $Q_{opt}$, as well as measurements and charging parameters, are stored as cumulative performance data, which may include performance evaluations for previous time steps and/or previous charging processes.

At block 110, the present charging profile Q-value ($Q_{cal}$) is compared to the optimal Q-value $Q_{opt}$. If the optimal Q-value $Q_{opt}$ is determined to be an improvement over the Q-value $Q_{cal}$, the Q-value $Q_{opt}$ is used to replace the existing charging profile with a charging profile that maps to the optimal Q-value.

The following are examples of conditions that can be used to determine whether to replace an existing Q-value with the optimal Q-value:

$$Q_{cal} = \begin{cases} Q_{opt} \text{ if } |I_{DCFC,opt} - I_{DCFC}| < f(SOC, T \\ Q_{cal} \qquad\qquad \text{otherwise} \end{cases},$$

and $$Q_{cal} = \begin{cases} Q & \Delta Perf > \Delta Perf_{th} \\ Q_{cal} & \text{otherwise} \end{cases}.$$

As shown, $Q_{cal}$ may be replaced with $Q_{opt}$ if a difference between $Q_{cal}$ and $Q_{opt}$ satisfies a function of SOC and T (f (SOC,T). This comparison checks whether a change in the current due to replacing $Q_{cal}$ with $Q_{opt}$ is below a maximum change in current. The function may be a difference in rate of SOC over time for a given value of T, or other function that captures an improvement in charging. The improvement may be reduced charge time, or improved battery health in terms of the limits on the performance variables (e.g., using the lithium plating boundary to operate further away from a lithium plating condition).

$Q_{cal}$ may be replaced with $Q_{opt}$ if a difference between the performance associated with $Q_{cal}$ and the performance associated with $Q_{opt}$ ($\Delta Perf$) represents a sufficient improvement in performance. For example, as shown, $Q_{cal}$ may be replaced with $Q_{opt}$ if $Q_{opt}$ ($\Delta Perf$) is greater than a selected performance difference threshold ($\Delta Perf_{th}$).

At block 111, if the condition(s) of block 110 are satisfied, a new charging profile $I_{DCFC,opt}$ is derived from the optimal Q-value $Q_{opt}$. The optimal charging profile $I_{DCFC,opt}$ may be used to update the charging profile for the next time step, or stored as cumulative performance data for use in a future update (e.g., an update at the end of the charging process).

At block 112, the cumulative performance data may be provided and used when performing a future charging process.

Figure 5:
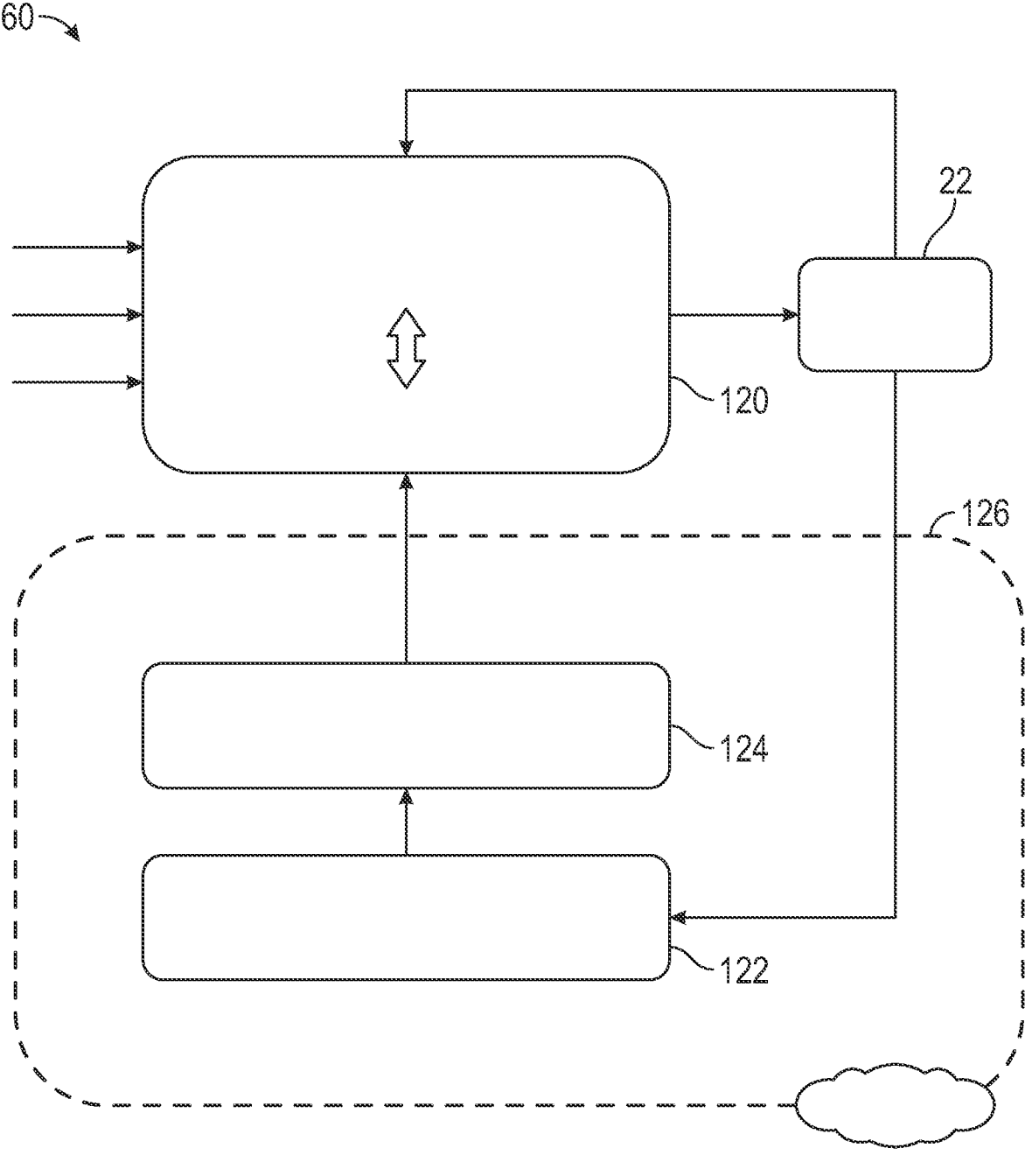
FIG. 5 depicts an example of a charging control system, in accordance with an exemplary embodiment.

FIG. 5 depicts an example of the charging control system 60, and shows how various functions can be performed locally and remotely. In this example, the charging control system 60 includes a local processing device 120, such as a charging controller, the OBCM 42, the monitoring unit 28, or other suitable processing device in a vehicle.

The system 60 also includes one or more remote processing devices for performing functions related to learning and optimization of charging profiles. For example, a remote real time optimizer 122 including a learning agent performs real time evaluation of charging profiles and Q-values, and updates Q-values. The updated Q-values may be transmitted to an onboard management unit 124 that provides periodic updates by periodically updating a locally stored LUT. The optimizer 122 and the onboard management unit 124 are remotely located (e.g., part of a cloud network 126).

Figure 6:
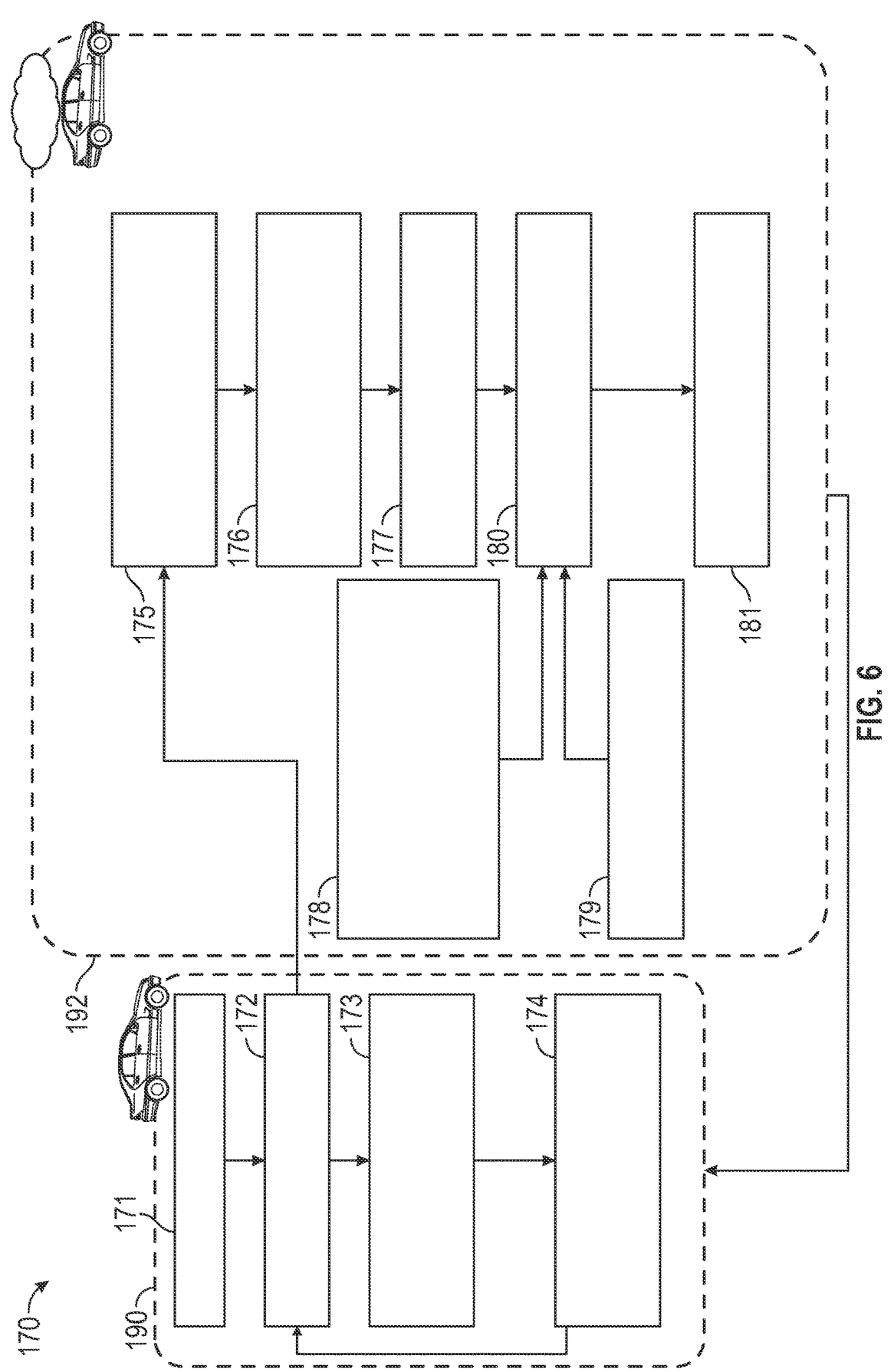
FIG. 6 is a flow diagram depicting a method of controlling a charging process and coordinating functions between local and remote processing resources, in accordance with an exemplary embodiment.
Figure 7:
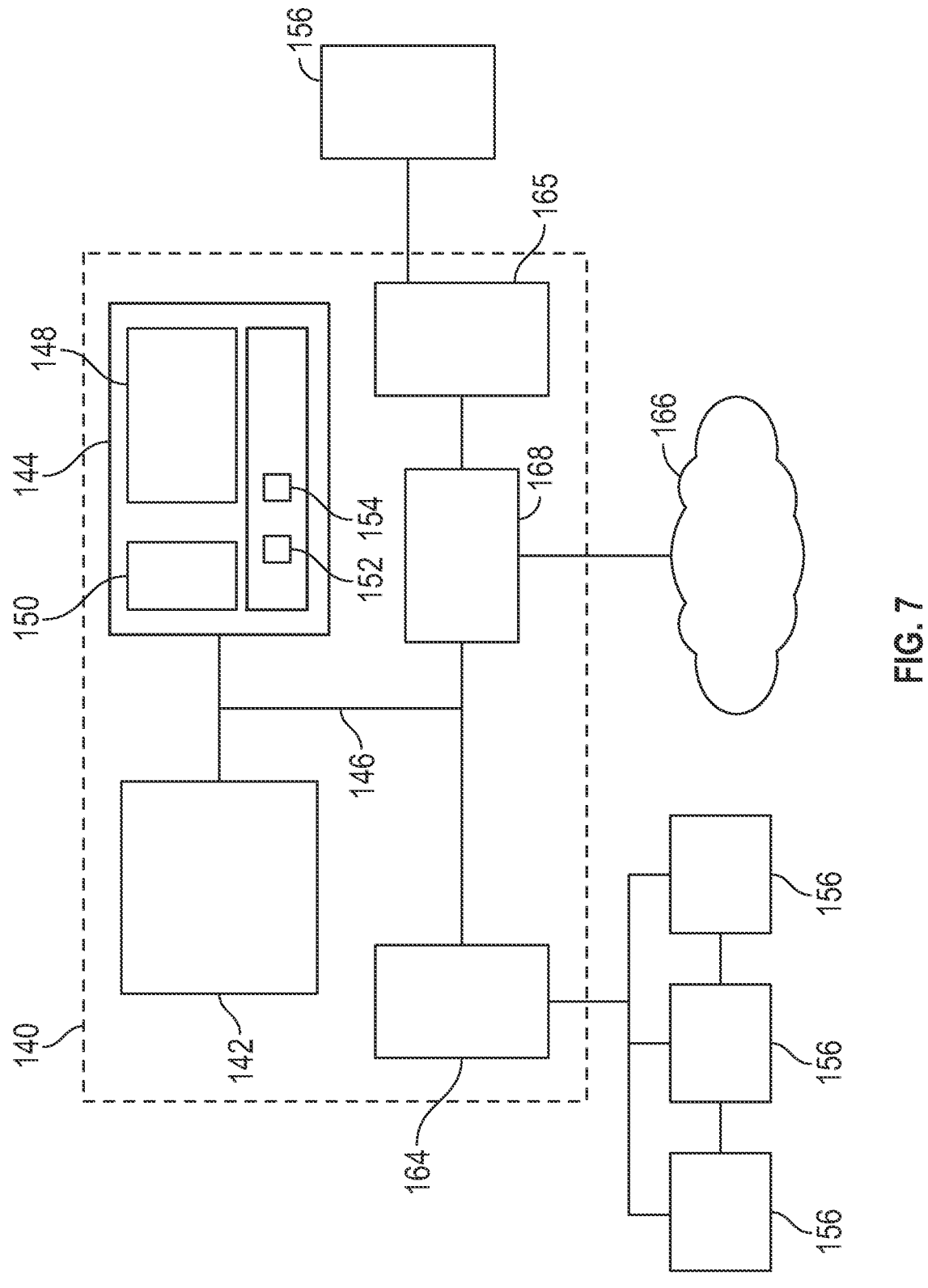
FIG. 7 depicts a computer system in accordance with an exemplary embodiment.

FIG. 6 is a flow diagram showing a method 170 of charging a battery assembly. FIG. 6 also illustrates an example of functions that are offloaded to a remote processing device or devices (e.g., cloud network devices).

The method 170 includes a number of steps or stages represented by blocks 171-181. The method 170 is not limited to the number or order of steps therein, as some steps represented by blocks 171-181 may be performed in a different order than that described below, or fewer than all of the steps may be performed.

In an embodiment, functions related to real time control of charging (blocks 171-174) are performed in parallel with functions related to optimization, learning and updating charging profiles (blocks 175-181). In an embodiment, the steps of blocks 171-174 are performed locally (represented by region 190), and the steps of blocks 175-181 are performed remotely (represented by region 192).

For example, one or more local processors perform the steps of blocks 171-174 during a time step of a charging process, and one or more remote processing devices (e.g., the optimizer 122 and onboard management unit 124) perform the steps of blocks 175-181.

At block 171, a charging process is initiated by connecting a vehicle to a power source and initiating a charging mode (e.g., DCFC charging mode enabled). The processing device stores charging profile parameters in a lookup table $LUT_{cal}(SOC,V_{cell},T)$.

At block 172, charging parameter measurements are received, including measurements of SOC, $V_{cell}$ and T.

At block 173, a present charging profile $I_{DCFC,cal}$ is determined from the charging parameter measurements by consulting the LUT. A charging current is applied to the battery system according to the present charging profile. At block 174, at completion of the present time step, charging is performed for a next time step.

At block 175, charging parameter measurements from block 172 are transmitted to a remote processing device (e.g., in a cloud computing network). For example, the optimizer 122 receives real time measurements and the present charging profile $I_{DCFC,cal}$, and uses Q-learning formulations to set up a Q-value $Q_{cal}$ for the present charging profile. The Q-value $Q_{cal}$ may be a previously calculated Q-value associated with the present charging profile.

At block 176, the present charging profile is iterated until an optimum or maximum Q-value $Q_{opt}$ is determined. The optimal Q-value $Q_{opt}$ is translated to a corresponding charging profile. The corresponding profile is an optimal profile $I_{DCFC,opt}$.

At block 177, the present current profile $I_{DCFC,cal}$ is compared to the optimal profile $I_{DCFC,opt}$. For example, the onboard management unit 124 compares the profiles to determine whether $I_{DCFC,opt}$ is an improvement. The comparison may be based on the conditions discussed at block 110 of the method 100.

At block 178, cumulative performance variables may be provided for use in deciding whether and when the stored charging profile and associated Q-value should be updated.

Examples of cumulative performance variables include charge duration for the entire charging process (or portion of the charging process), proximity of anode potential $V_n$ to zero or a threshold value, aging parameters (e.g., qloss), lithium plating boundary, and others. Historical and/or reference data may also be provided to inform this decision (block 179).

At block 180, an update decision is made based on the comparison (and cumulative performance and/or historical data if desired).

If the decision is affirmative, at block 181, the optimal Q-value $Q_{opt}$ is converted to an LUT ($LUT_{opt}$), and the stored Q-value ($Q_{cal}$) is updated accordingly in local storage.

FIG. 6 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a battery system, and a module 154 may be included to perform functions related to controlling charging and learning as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. The network may be a cloud computing network that a vehicle can wirelessly communication with. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for control of a battery system, comprising:
a processor electrically connected to the battery system, the processor configured to perform, in real time during a charging process:
acquiring a set of charging parameter measurements, the charging parameter measurements including a voltage, a current applied to the battery system during the charging process and a temperature of the battery system;
estimating a dynamic performance variable related to an electrochemical phenomenon occurring within the battery system during the charging process;
selecting a stored charging profile from a stored relation based on the charging parameter measurements, wherein the stored charging profile is subject to a charging limit including a performance parameter limit;
applying a charging current to the battery system based on the selected stored charging profile;
inputting the charging parameter measurements, the stored charging profile and the stored relation to a learning agent; and evaluating the stored charging profile by the learning agent according to a reward-based learning process, the learning process including estimating a performance value associated with the stored charging profile,
wherein the processor is configured to periodically update the stored charging profile based on the learning process.

2. The system of claim 1, wherein the learning process is a model-free iterative learning process.

3. The system of claim 2, wherein an iteration of the learning process is performed in real time for each time step of the charging process based on the stored charging profile and charging parameter measurements acquired at each time step.

4. The system of claim 3, wherein periodically updating is performed in response to at least one of: completion of the iteration, completion of a selected number of iterations, completion of a charging process and completion of a selected number of charging processes.

5. The system of claim 3, wherein the learning process includes, for each iteration, estimating the performance value based on a reward feedback that is a function of at least the performance parameter.

6. The system of claim 5, wherein the reward feedback includes a first reward value associated with charge time, a second reward value associated with battery health, and a third reward value associated with battery aging.

7. The system of claim 1, wherein the processor is configured to perform, during a design phase:
acquiring a set of initial battery conditions associated with the battery system;
generating an initial calibrated charging profile by the learning agent using the learning process, the learning process including iteratively evaluating a set of charging parameters, wherein the evaluating is performed experimentally on a physical battery or performed on a simulation of the battery system; and
storing the initial calibrating charging profile as the stored charging profile.

8. The system of claim 1, wherein the dynamic performance variable is selected from at least one of an electrolyte ion concentration at an anode side of a battery cell, an anode potential, a decay rate of electrolyte anode concentration, and a capacity loss.

9. The system of claim 8, wherein the charging limit includes a performance variable limit being at least one of: a capacity loss limit, an anode potential limit, a lithium plating limit, and a limit to the electrolyte ion concentration at the anode side of the battery cell.

10. The system of claim 1, wherein the processor includes a local processing device disposed in a vehicle, the vehicle is configured to wirelessly communication with a remote processing device.

11. The system of claim 10, wherein selecting the stored charging profile is performed by the local processing device, evaluating the stored charging profile is performed by the remote processing device, and periodically updating the stored charging profile includes transmitting an updated charging profile from the remote processing device to the local processing device.

12. A method of controlling a battery system, comprising:
acquiring, by a processor electrically connected to the battery system in real time during a charging process, a set of charging parameter measurements, the charging parameter measurements including a voltage, a current applied to the battery system during the charging process and a temperature of the battery system;

estimating a dynamic performance variable, the performance variable related to an electrochemical phenomenon occurring within the battery system during the charging process;

selecting a stored charging profile from a stored relation based on the charging parameter measurements, wherein the stored charging profile is subject to a charging limit including a performance variable limit;

applying a charging current to the battery system based on the selected stored charging profile;

inputting the charging parameter measurements, the stored charging profile and the stored relation to a learning agent;

evaluating the stored charging profile by the learning agent according to a reward-based learning process, the learning process including estimating a performance value associated with the stored charging profile; and periodically updating the stored charging profile based on the learning process.

13. The method of claim 12, wherein the learning process is a model-free iterative learning process, and an iteration of the learning process is performed in real time for each time step of the charging process based on the stored charging profile and charging parameter measurements acquired at each time step.

14. The method of claim 13, wherein the learning process includes, for each iteration, estimating the performance value based on a reward feedback that is a function of at least the dynamic performance variable.

15. The method of claim 12, wherein the performance variable is estimated based on the charging parameter measurements and a mathematical model configured to simulate electrochemical processes in the battery system.

16. The method of claim 12, wherein the processor includes a local processing device disposed in a vehicle, the vehicle configured to wirelessly communication with a remote processing device, and wherein selecting the stored charging profile is performed by the local processing device, evaluating the stored charging profile is performed by the remote processing device, and periodically updating the stored charging profile includes transmitting an updated charging profile from the remote processing device to the local processing device.

17. A vehicle system comprising:

a memory having computer readable instructions; and a processing device for executing the computer readable instructions, the computer readable instructions controlling the processing device to perform a method including:

acquiring, by a processor electrically connected to a battery system in real time during a charging process, a set of charging parameter measurements, the charging parameter measurements including a voltage, a current applied to the battery system during the charging process and a temperature of the battery system;

estimating a dynamic performance variable, the performance variable related to an electrochemical phenomenon occurring within the battery system during the charging process;

selecting a stored charging profile from a stored relation based on the charging parameter measurements, wherein the stored charging profile is subject to a charging limit including a performance variable limit;

applying a charging current to the battery system based on the selected stored charging profile;

inputting the charging parameter measurements, the stored charging profile and the stored relation to a learning agent;

evaluating the stored charging profile by the learning agent according to a reward-based learning process, the learning process including estimating a performance value associated with the stored charging profile; and periodically updating the stored charging profile based on the learning process.

18. The vehicle system of claim 17, wherein the learning process is a model-free iterative learning process, and an iteration of the learning process is performed in real time for each time step of the charging process based on the stored charging profile and charging parameter measurements acquired at each time step.

19. The vehicle system of claim 18, wherein periodically updating is performed in response to at least one of: completion of the iteration, completion of a selected number of iterations, completion of a charging process and completion of a selected number of charging processes.

20. The vehicle system of claim 17, wherein the performance variable is estimated based on the charging parameter measurements and a mathematical model configured to simulate electrochemical processes in the battery system.

* * * * *